(12) United States Patent
Lee

(10) Patent No.: US 7,836,232 B2
(45) Date of Patent: Nov. 16, 2010

(54) SINGLE WIRE SERIAL COMMUNICATION SYSTEM

(75) Inventor: Kyung Tak Lee, Seoul (KR)

(73) Assignee: KEC Corporation (KR)

( * ) Notice: Subject to any disclaimer, the term of this patent is extended or adjusted under 35 U.S.C. 154(b) by 931 days.

(21) Appl. No.: 11/651,677

(22) Filed: Jan. 10, 2007

(65) Prior Publication Data

US 2009/0013100 A1    Jan. 8, 2009

(30) Foreign Application Priority Data

Aug. 25, 2006  (KR)  ............... 10-2006-0081109

(51) Int. Cl.
*G06F 13/38* (2006.01)
*G06F 3/00* (2006.01)
*G06F 15/16* (2006.01)

(52) U.S. Cl. .................. 710/62; 710/29; 710/64; 709/230; 709/232

(58) Field of Classification Search .......... None
See application file for complete search history.

(56) References Cited

U.S. PATENT DOCUMENTS

| | | | |
|---|---|---|---|
| 6,408,008 B1 * | 6/2002 | Komarek et al. ............. 370/458 |
| 6,438,462 B1 * | 8/2002 | Hanf et al. .................. 700/297 |
| 7,054,374 B1 * | 5/2006 | Jensen et al. ................ 375/257 |
| 7,181,557 B1 * | 2/2007 | Falik et al. .................. 710/110 |
| 7,606,955 B1 * | 10/2009 | Falik et al. .................. 710/110 |
| 7,693,244 B2 * | 4/2010 | Gupta et al. ................. 375/355 |
| 2004/0123167 A1 * | 6/2004 | Chapuis ...................... 713/300 |
| 2005/0259609 A1 * | 11/2005 | Hansquine et al. .......... 370/328 |
| 2006/0242501 A1 * | 10/2006 | Kimelman et al. .......... 714/724 |

\* cited by examiner

*Primary Examiner*—Henry W Tsai
*Assistant Examiner*—Michael Sun
(74) *Attorney, Agent, or Firm*—Park & Associates IP Law LLC

(57) ABSTRACT

Disclosed is a single wire communication system for communicating between integrated circuits. The single wire communication system comprises an upper control device generating control commands, a to-be-controlled chip operating with the control commands, and a single wire communication module transferring the control commands. The single wire communication module processes the control commands from the upper control device with the control commands separated into a start signal, a data signal, an end signal, and an ack signal, converts them to at least one or more bits of data bits, and the transfers them to the to-be-controlled chip. By doing so, the present invention can transfer the control commands from the upper control device to the to-be-controlled chip without any loss or distortion caused from unstable factors such as noises, and enables high speed process of a number of commands.

21 Claims, 8 Drawing Sheets

SINGLE WIRE SERIAL COMMUNICATION SYSTEM

FIELD OF THE INVENTION

The present invention relates to communicating between integrated circuits and a device therefor.

BACKGROUND OF THE INVENTION

Circuits mounted in computers, various mobile devices, and so forth include various kinds of many IC chips. The IC chip is largely classified into a controller or central processing unit corresponding to an upper level control device and a peripheral controlled by the controller or central processing unit, the peripheral operates with the control of the upper level control device, or serves to transfer control commands to lower level devices.

For this purpose, communication is performed between an upper control device and a peripheral, or a peripheral and a lower level device, and communication terminals are provided for communication therebetween. This communication can be utilized, for example, to control microprocessors, LCD driver chips, remote I/O ports, RAMs, EEPROMs, telephones, or video system modules by an upper control device.

RS232C and IIC (Inter IC Bus) methods are typically employed for the communication between chips or between modules. Besides, a linear step method employing the concept of PWM (Pulse Width Modulation) and a shift method employing a counter are also used for the above communication. The IIC method uses two pins to perform a communication; one for transferring data corresponding to control commands and the other for transferring clocks for synchronization. This IIC method enables high-speed communication approaching 100 Kbps and 400 Kbps. The counter method selects the predetermined number of commands according to a signal from a master side. For example, in the case that the counter method is set to be capable of controlling eight commands, eight commands are counted up in the order and a desired command is selected among eight commands.

These existing bus communication methods have many problems originating from the afore-mentioned properties. First of all, in the IIC method of enabling high-speed communication, two pin terminals should be prepared and thereby a bus should be also configured in two lines. Therefore, the IIC method makes it more difficult to make a circuit module smaller while allowing the circuit module to be more integrated. The shift method, which transfers data in a single wire method, is quire cumbersome in that sequential counting should be carried out to perform the eighth command after the first command. As a consequence, the shift method has problems in that the operation speed responding to a command is slow and it is difficult to indicate many operations and commands. In the method using a single wire, it has also been difficult to remove noises or request data again although the noises are added to signals in the middle of the transmission of the signals Hence, the existing single wire method has frequently suffered from the malfunction due to the noises.

SUMMARY OF THE INVENTION

The present invention relates to communicating between integrated circuits and a device therefor.

BRIEF DESCRIPTION OF THE DRAWINGS

The present invention will be more apparent from the following detailed description taken in conjunction with the accompanying drawings.

FIG. 1a is a view illustrating a state where a to-be-controlled chip and a single wire serial communication module are separated from each other.

FIG. 1b is a view illustrating a state where a to-be-controlled chip and a single wire serial communication module are integrally formed to each other.

FIG. 7a is a view illustrating the length of a start signal and each data bit.

FIG. 7b is a view illustrating the length of an end signal and an ack signal.

Common reference numerals are used throughout the drawings and the detailed description to indicate the same elements.

DETAILED DESCRIPTION OF THE INVENTION

It should be noted that the below detailed descriptions taken in conjunction with accompanying drawings would be provided only as preferred embodiments of the present invention in a manner not to limit the present invention, and the equal functions or their equivalents included in the spirit or scope of the present invention could be achieved from other embodiments of the present invention.

Some features of the present invention disclosed by the drawings are shown in an expanded manner for the convenience of description, and fails to provide a correct ration for the drawings and their components. Nevertheless, it could be easily understood by those skilled in the art.

Hereinafter, embodiments of the present invention will be described in more detail with reference to accompanying drawings.

FIG. 1 is a view illustrating a single wire serial communication system according to the present invention.

Figure 1A:
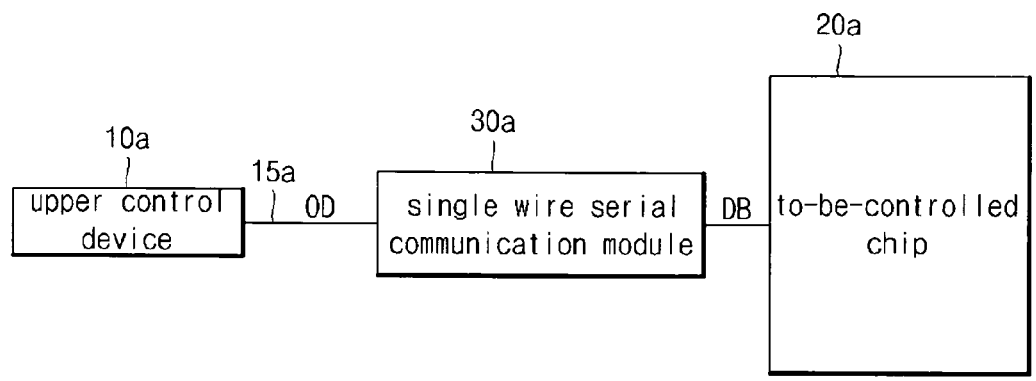
FIGS. 1a and 1b are constructional views illustrating a single wire serial communication system according to the present invention.
Figure 1B:
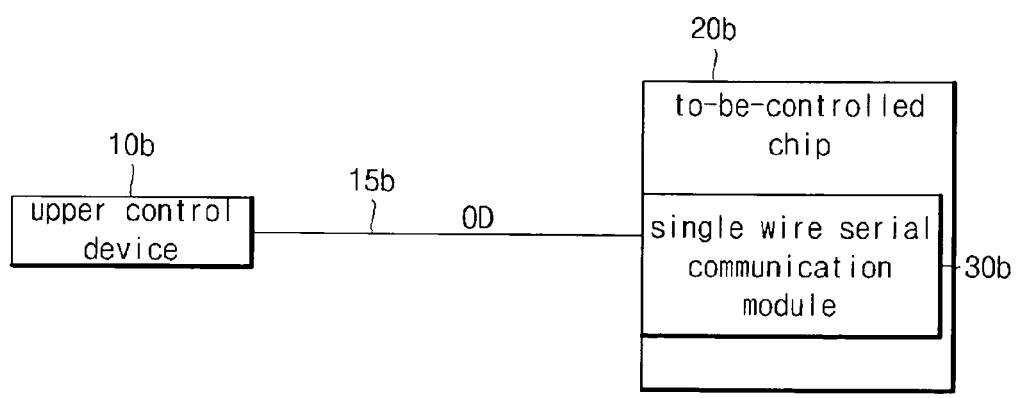

Referring to FIG. 1, the single wire serial communication system according to the present invention comprises: an upper control device 10 (10a, 10b); a to-be-controlled chip 20 (20a, 20b); and a single wire serial communication module 30 (30a, 30b). The single wire serial communication module 30 is mounted within or adjacent to the to-be-controlled chip 20 to be integrally usable. The to-be-controlled chip 20 may be a device, which operates with a control command of the upper control device 10 or relays the control command to other devices. This to-be-controlled chip 20 may comprise, but not limited to, a microprocessor, an I/O port, a memory, an EEPROM, and so forth. At this time, the single wire serial communication module 30 of the present invention receives operation data OD containing a control command from the upper control device 10 and transfers the operation data OD to the to-be-controlled chip 20. The upper control device 10 may comprise, but not limited to, an upper micro controller, an upper control device, or the equivalents thereof. FIG. 1*a* shows a case where the single wire serial communication module 30*a* is separately provided adjacently to the to-be-controlled chip 20, and FIG. 1*b* shows a case where the single wire serial communication module 30*b* is mounted within the to-be-controlled chip 20.

The upper control device 10 transfers the operation data OD to the single wire serial communication module 30 using a single bus SB 15. These operation data OD may comprise: a start signal SS driving a function of the single wire serial communication module 30; a data signal DS assigning an operation of the to-be-controlled chip 20; an ack signal AS enabling the single wire serial communication module 30 to verifying whether data are normally transferred or not; and a stop signal STS converting the single wire serial communication module 30 to a dormant state.

The operation data OD are sequentially transferred to the single wire serial communication module 30 through the single bus 15, and the single wire serial communication module 30 provides the transferred operation data OD to the to-be-controlled chip 20. In particular, the single wire serial communication module 30 transfers a data signal DS, which is an operation command among the operation data OD, to the to-be-controlled chip 20.

Figure 2:
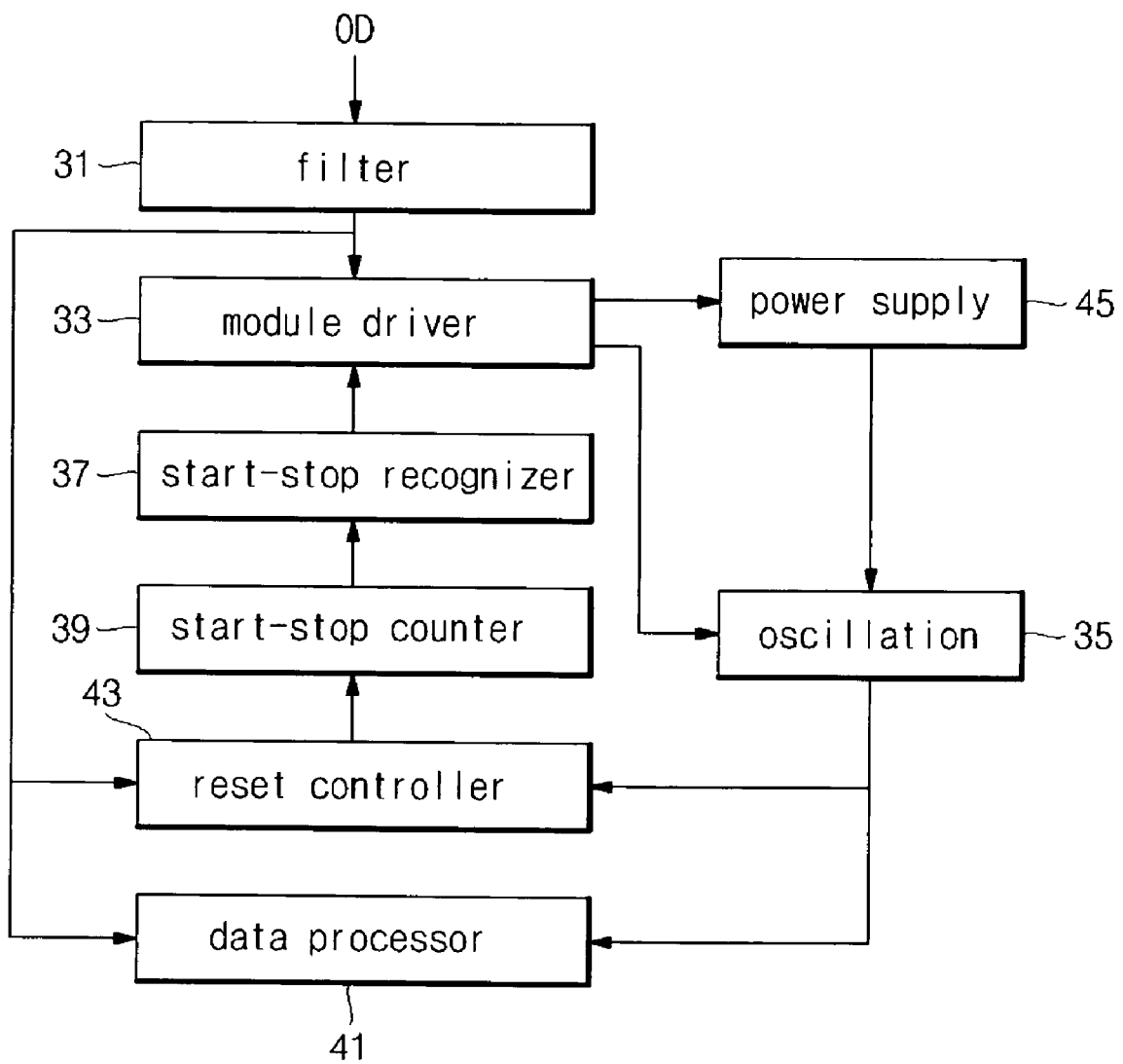
FIG. 2 is a block diagram illustrating an inner construction of the single wire serial communication module of FIG. 1.

FIG. 2 is a block diagram illustrating an inner construction of the single wire serial communication module of FIG. 1.

Referring to FIG. 2, the single wire serial communication module 30 according to the present invention, comprises a filter 31, a module driver 33, an oscillation circuit 35, a start-stop recognizer 37, a start-stop counter 39, a data processor 41, a reset controller 43, and a power supply 45.

The filter 31 receives operation data OD from the upper control device, remove noises added to the operation data OD, and then provides the operation data OD to the module driver 33, data processor 41, and reset controller 43.

The module driver 33 drives the single wire serial communication module 30 under the dormant state according to the operation data OD transferred through the filter 31, or converts the driven single wire serial communication module 30 to the dormant state. For this purpose, the module driver 33 is connected to the filter 31, and includes a determiner determining whether driven state or dormant state. The determiner may comprise, but not limited to, a NAND gate (NAND) or the equivalents thereof. The module driver 33 drives the oscillation circuit 35 when receiving signals including the operation data OD from the upper control device 10 to thereby control the oscillation circuit 35 so that clocks CLS are supplied to an inner circuit of the single wire serial communication module 30. The module driver 33 receives an enable signal ES from the start-stop recognizer to control the oscillation circuit 35. In addition, the module driver 33 controls the single wire serial communication module 30 to be kept to the dormant state by the enable signal ES until receiving a stop signal STS2 from the start-stop recognizer 37 after ending to receive the start signal SS from the upper control device 10.

The oscillation circuit 35 provides clocks CLS to the inner circuit of the single wire serial communication module 30 according to the control of the module driver 33. The clocks CLK from the oscillation circuit 35 are supplied to the data processor 41 and reset controller 43. The data processor 41 extracts the data signal DS from the operation data OD and the reset controller 43 performs the reset of the start-stop counter 39 using the clocks CLS from the oscillation circuit 35.

The start-stop counter 39 transfers a signal confirm signal SCS to the start-stop recognizer 37 using the operation data OD so that the start-stop recognizer 39 may determine the start signal SS or stop signal STS from the signals contained in the operation data OD. In addition, the start-stop counter 39 is initialized by the reset controller 43 when receiving signals not to fit the specification for the start signal SS or stop signal STS in the middle of generation of the signal confirm signal SCS. For this purpose, the start-stop counter 39 may comprise, but not limited to, logical elements including a number of flip-flops or NAND gates. In addition, the start-stop counter 39 may receive the operation data OD provided from the filter 31 through the reset controller 43, but the present invention is not limited thereto. Moreover, the start-stop counter 39 may be separated into a start counter and a stop counter, and, at this time, the reset controller may be removed. In addition, in case of being separated into the start counter and stop counter, the start-stop counter 39 may comprise a number of flip-flops and logical elements. While the above embodiment of the present invention illustrates a case where the start-stop counter 39 receives clocks via the reset controller 43, the present invention is not limited thereto.

The start-stop recognizer 37 receives the signal confirm signal SCS from the start-stop counter 39, and then, in the case that the received operation data OD is the start signal SS, provides the enable signal ES to the module driver 33. In addition, the start-stop recognizer 37 provides the stop signal STS2 to the module driver 33 in the case that the received operation data OD is the stop signal STS. For this purpose, the start-stop recognizer 37 may comprise, but not limited to, logical elements such as at least one flip-flop and inverter. The start-stop recognizer 37 controls the module driver 33 to maintain the single wire serial communication module 30 to driven state or dormant state according to the signals contained in the operation data OD in case of receiving the operation data OD through the single bus. Especially, the present invention enables the module driver 33 to prevent signal confusion from occurring because the start signal SS, data signal DS, ack signal AD, and stop signal STS all are transmitted through the single bus. That is, the signals received from the arrival of the start signal SS to the arrival of the stop signal STS are considered as the data signal DS and ack signal AS, which provides an environment where the single wire serial communication module 30 can process the data signal DS and ack signal AS. In other words, the start-stop recognizer 37 controls the module driver 33 so that the single wire serial communication module 30 may be kept to the driven state until the stop signal STS is received after the start signal SS was received. This will be more detailed with reference to a waveform to be described later.

The reset controller 43 provides the operation data OD transferred through the filter 31 to the start-stop counter 39, as well as determines whether the operation data OD are right or wrong. If the operation data OD are wrong data, then the reset controller 43 resets and initializes the operation data OD transferred to the start-stop counter 39. For this purpose, the reset controller comprises a number of logical elements.

The data processor 41 receives the data signal DS and ack signal AS supplied between the start signal SS and stop signal STS and transfers them to the to-be-controlled chip 20. For this purpose, the data processor 41 receives a signal applied after the start signal SS was applied, determines the number of bits of the signal and whether the signal is normal or not to thereby arrange the signal, and then transfers the signal to the to-be-controlled chip 20. The data processor 41 comprises a data read part, a bit recognition part, a data output part, and an ack-read part. The data processor 41 will be more detailed with reference to FIG. 3.

The power supply 45 supplies power for driving of the single wire serial communication module 30. More specifically, the power supply 45 provides a driving voltage and a reference voltage for driving the elements mounted inside of the single wire serial communication module 30. The power supply 45 is driven by the module driver in case of receiving a signal from the upper control device. At this time, the power supply 45 supplies power to the oscillation circuit 35 to thereby enable the oscillation circuit 35 to provide the clocks CLS to the inside of the single wire serial communication module 30. And, the power supply 45 stops supplying power according to the module driver 33 to thereby enable the single wire serial communication module 30 to maintain the dormant state.

Figure 3:
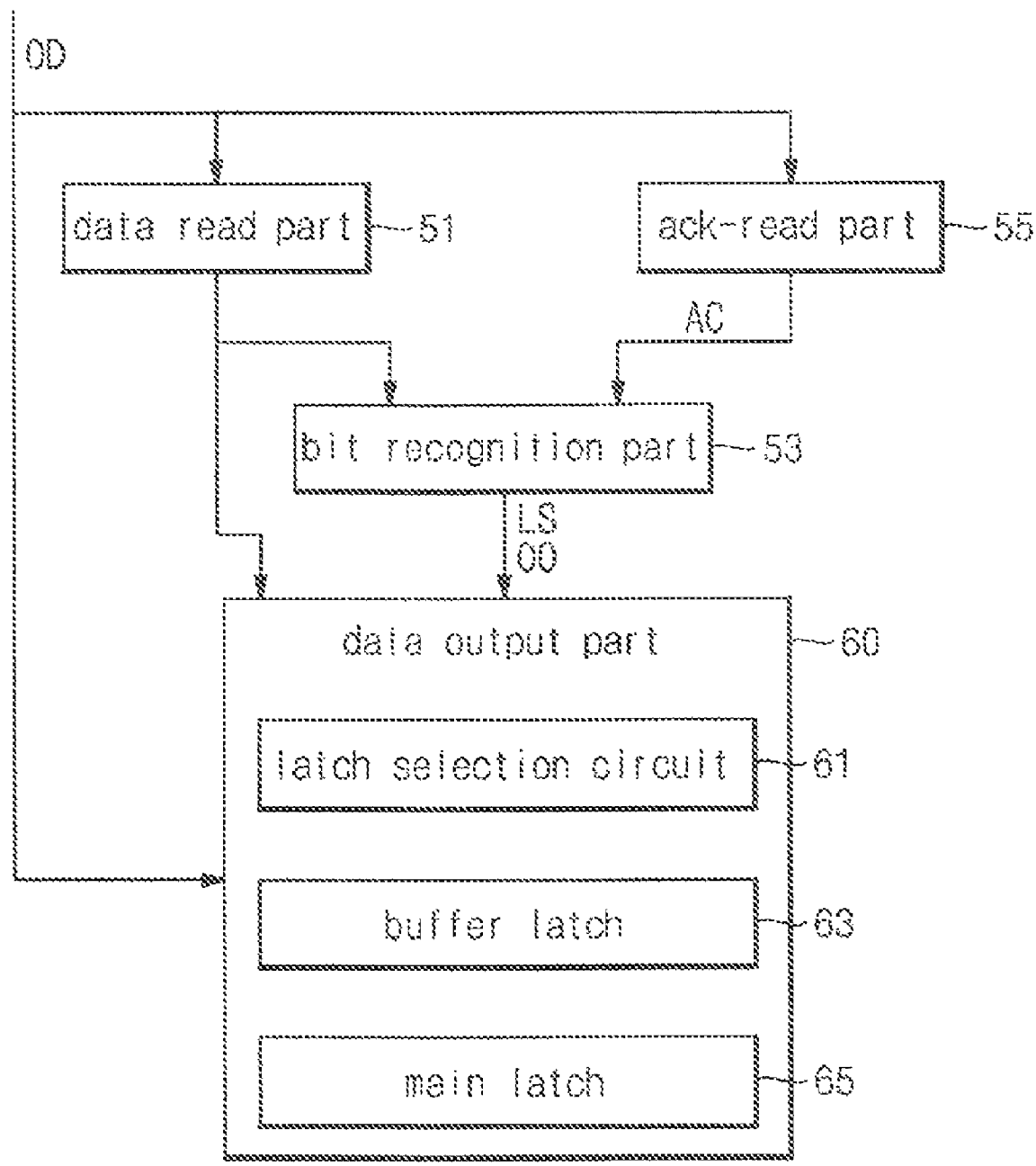
FIG. 3 is a block diagram illustrating a data processing unit of FIG. 2 in detail.

FIG. 3 is a block diagram illustrating a data processing unit of FIG. 2 in detail.

Referring to FIG. 3, the data processor operates with the control of the module driver 33 when receiving a signal from the upper control device 10 as described above with reference to FIG. 2. This data processor 41 includes a data read part 51, an ack-read part 55, a bit recognition part 53, and a data output part 60.

The data read part 51 enables the data signal DS to be stored from the operation data OD received via the filter 31 to a buffer latch 63 of the data output part 60. The data read part 51 enables a signal during a specific period among signals received prior to the application of the start signal SS to be stored at the buffer latch 63. That is, the data read part 51 generates a save order SO, which enables the value of the signal transferred from the filter 31 to be inputted to the latch after a predetermined time have lapsed from each bit period, and transfers the save order SO to the data output part 60.

The bit recognition part 53 checks the bit number of data stored at the data output part 60 by the data read part 51 and determines which buffer latch 63 the signal value is stored at. In addition, the bit recognition part 53 controls the data output part 60 to enable the signal value stored at the data output part 60, i.e. data bit DB, to be transferred to the to-be-controlled chip 20, in the case that the number of received bits conforms to the predetermined number and an ack confirm signal AC is received from the ack-read part 55. For this purpose, the bit recognition part 53 generates a latch select signal LS for selecting a latch storing the signal value and an output signal for controlling data output, and transfers them to the data output part 60. The bit recognition part 53 may comprise, but not limited to, a number of flip-flops.

The ack-read part 55 determines the ack signal AS contained in the operation data OD. And, the ack-read part 55 generates the ack confirm signal AC with the arrival of the ack signal AS and then transfers the ack confirm signal AC to the bit recognition part 53. The bit recognition part 53 outputs the data bit DB stored at the main latch 65 to the to-be-controlled chip 20 according to the ack confirm signal AC. If the ack confirm signal AC is received while the bit recognition part 53 stores the signal at the buffer latch 63 of the data output part 60, then the bit recognition part 53 stops storing data bit DB so that the wrong input data is not transferred to the to-be-controlled chip 20.

The data output part 60 stores the value of the signal transferred from the filter 31 according to the store order SO from the data read part 51. In particular, the data output part 60 stores the signal value to the different regions, i.e. different buffer latches 63, according to the latch select signal LS from the bit recognition part 53 and the store order SO from the data read part 51. And, the data output part 60 stores the signal value stored at the buffer latch 63 to the main latch 65 and transfers it to the to-be-controlled chip 20 according to the output order OO from the bit recognition part 53. For this purpose, the data output part 60 comprises a latch selection circuit 61 determining where the signal value is stored according to the store order SO and latch select signal LS, a buffer latch 63 temporarily storing the signal value, and a main latch 65 receiving the signal value from the buffer latch 63 and transferring the signal value to the to-be-controlled chip 20.

Figure 4:
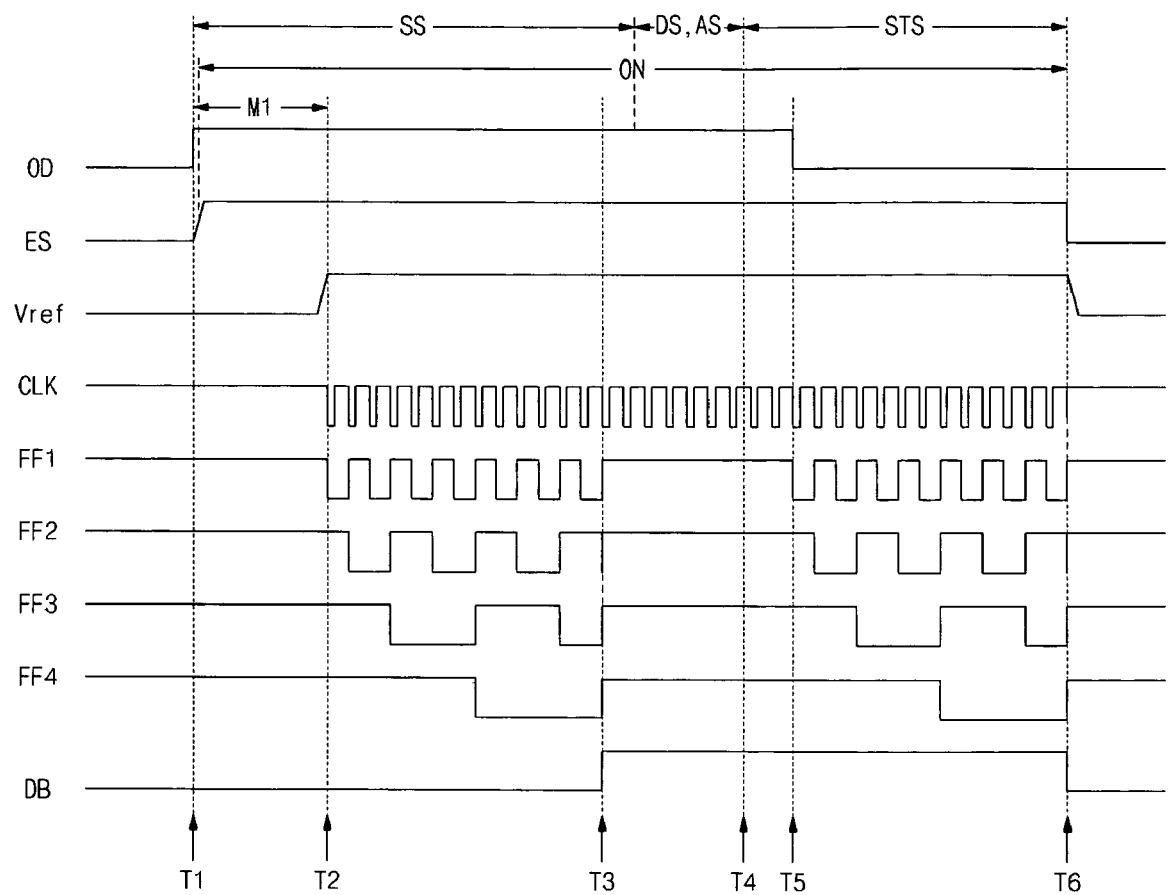
FIG. 4 is a view illustrating an example of a waveform for converting the single wire serial communication module of FIG. 2 to a driving state or dormant state.
Figure 5:
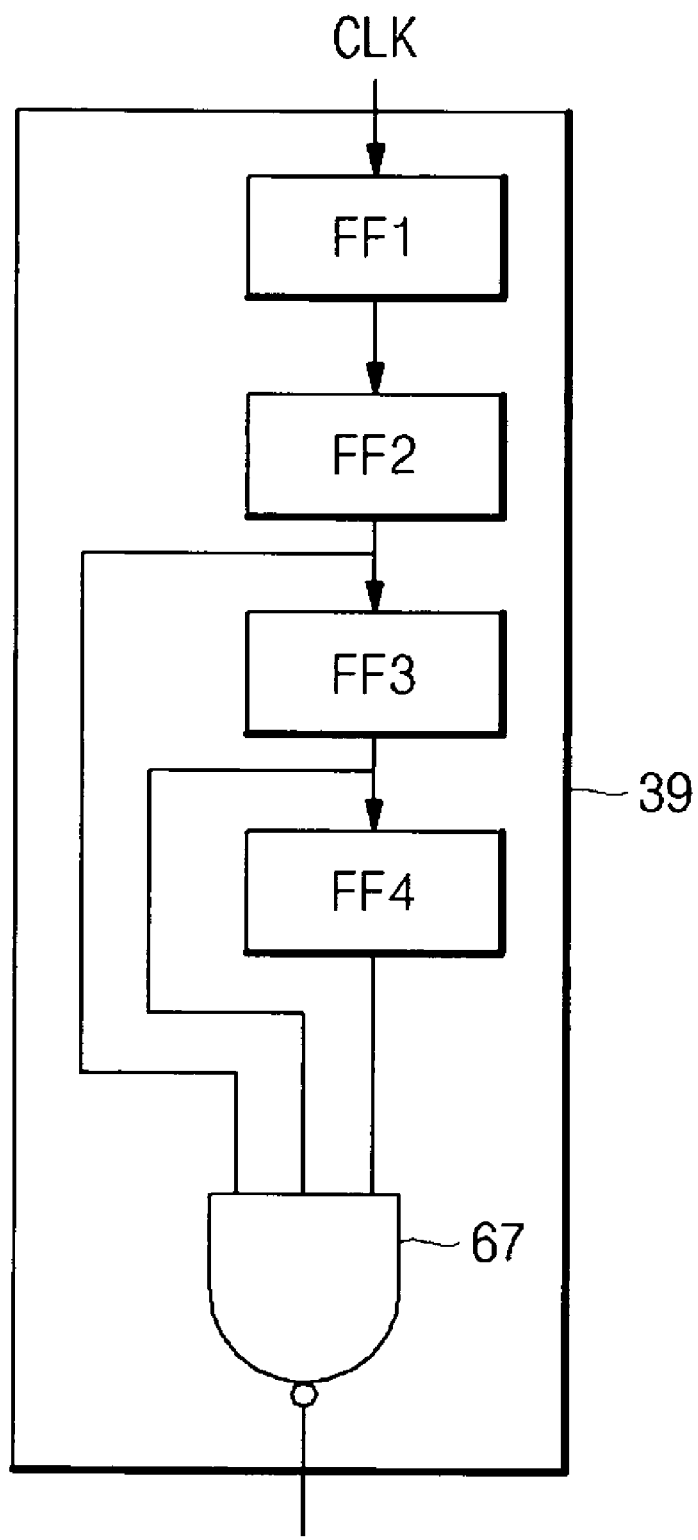
FIG. 5 is a schematic view illustrating a construction of flip-flops usable as a start-stop counter.

FIG. 4 is a view illustrating an example of a waveform for converting the single wire serial communication module of FIG. 2 to a driving state or dormant state. And, FIG. 5 is a schematic view illustrating a construction of flip-flops usable as a start-stop counter. Here, FIGS. 4 and 5 show waveforms illustrating the conversion of the single wire communication module 30 to driven state or dormant state and the driving of the to-be-controlled chip 20 according of the conversion. FIG. 4 and subsequent figures shows the clocks CLS operate by falling edge triggers. In addition, FIG. 4 shows an example that the start-stop counter 39 comprises four flip-flops and employs a clock frequency of 1 MHz, but the present invention is not limited thereto.

Referring to FIGS. 4 and 5, the operation data OD provided from the upper control device comprises a data signal separable into four. That is, the operation data OD comprises a start signal SS, a data signal DS, an ack signal AS, and a stop signal STS. First, the start signal SS drives the single wire serial communication module 30 and to-be-controlled chip 20 in the dormant state. The data signal DS contains a command to be transferred to the to-be-controlled chip 20 maintaining the driven state. The ack signal AS informs the single wire communication module 30 of the transmission end of the data signal DS, and the stop signal STS returns the to-be-controlled chip 20 and single wire communication module 30 to the dormant state after the to-be-controlled chip 20 and single wire communication module 30 received the operation data OD to be driven.

The data signal DS and ack signal AS are omitted and the start signal SS and stop signal STS are only shown in FIG. 4. The data signal DS and ack signal AS will be described later with reference to FIG. 6.

The operation data OD starts to be transferred from the upper control device 10 at a first point of time T1. Accordingly, the module driver 33 controls the oscillation circuit 35 to generate clocks CLK. 'ES' of FIG. 4 refers to a waveform of the enable signal ES. The enable signal enables the single wire serial communication module 30 to maintain the driven state even though the operation data OD stops being transferred at a fifth point of time T5.

On the other hand, if the oscillation circuit 35 starts to be driven by the module driver 33, then the power supply 45 supplies power for generating clocks CLK. The power, however, is supplied to the oscillation circuit 35 at a second point of time T2 after a constant time is delayed from the first point of time T1, when the operation data OD is transferred, due to a driving margin M1 required to drive the power supply 45. The supplied power makes the oscillation circuit 35 generate the clocks CLK from the second point of time T2 and supply the clocks CLK to the inside of the single wire communication module 30. The start-stop counter 39, start-stop recognizer 37, and data processor 41 are converted to the driven state, accordingly. In fact, the start-stop counter 39, start-stop recognizer 37, and data processor 41 may be converted to the driven state simultaneously when the power supply 45 supplies power with the control of the module driver 33. However, the present invention is not limited thereto.

The clocks CLK are supplied to the start-stop counter 39 at the second point of time T2, and a first flip flop FF1 transforms the phase of the signal at each falling edge of the clocks CLK and outputs it. The signal is transferred in this manner from the first flip-flop FF1 to a fourth flip-flop FF4. At this time, outputs of the flip-flop FF1 to FF4 all are converted to '1' fourteen clocks after the second point of time T2, i.e. at a third point of time T3. Hence, the same signal is supplied to the NAND gate 67 included in the start-stop counter 39. The output of the NAND gate 67 becomes '0' only in the case that the outputs of the flip-flops FF1 to FF4 all are '1', because the NAND gate 67 is included in output terminals of the flip-flops FF1 to FF4. That is, the low output ('0') of the NAND gate 67 can be used as the signal confirm signal SCS in FIGS. 4 and 5.

The start-stop recognizer 37 having received the signal confirm signal SCS corresponding to the low signal ('0') from the start-stop counter 39 controls the module driver 33 to enable the single wire serial communication module 30 to maintain the driven state. The start-stop recognizer 37 may be simply implemented by flip-flops similarly to the start-stop counter 39, but the present invention is not limited thereto. The start-stop recognizer 37 can maintain logical values until the signal confirm signal SCS is supplied again from the start-stop counter 39 in case of being configured using T-flip-flops because the previous signal level can be maintained until separate signal is supplied.

The to-be-controlled chip 20 starts to be driven at the third point of time T3. That is, the operation data OD are transferred from the single wire communication module 30 to the to-be-controlled chip 20 at the period prior to the third point of time T3. In addition, the data signal DS and ack signal AS are transferred to and processed by the single wire serial communication module 30.

The stop signal STS is transferred from the upper control device 10 prior to the fourth point time when the ack signal AS stops being received. At this time, while it appears that the data values of the operation data OD are transferred until the fourth point of time T4, the data values could not be transferred in real cases. The data signal is represented as 'ON' state to show this period is for a margin required to transmit the data signal DS and ack signal AS.

Meanwhile, the start-stop counter 39 keeps checking the operation data OD even after the third point of time T3. That is, the start-stop counter 39 continues to check the operation data OD since the stop signal STS may be transferred at any point of time the operation data OD is transferred. In this situation, the ack signal AS stops being transferred and the flip-flops FF1 to FF4 are operated according to the clocks CLK in the same pattern as the start signal SS. Accordingly, if the output values of the flip-flops FF1 to FF4 become equal to one another at a sixth point of time, then the start-stop counter 39 transfers the signal confirm signal SCS to the start-stop recognizer 37. The phase of the value recorded at the start-stop recognizer 37 is changed by the signal confirm signal SCS, which causes the single wire communication module 30 to be converted to the dormant state. While it is shown that the to-be-controlled chip 20 is turned off at the sixth point of time in FIG. 4, this means the operation data OD have stopped being transferred from the single wire communication module 30 to the to-be-controlled chip 20.

Figure 6:
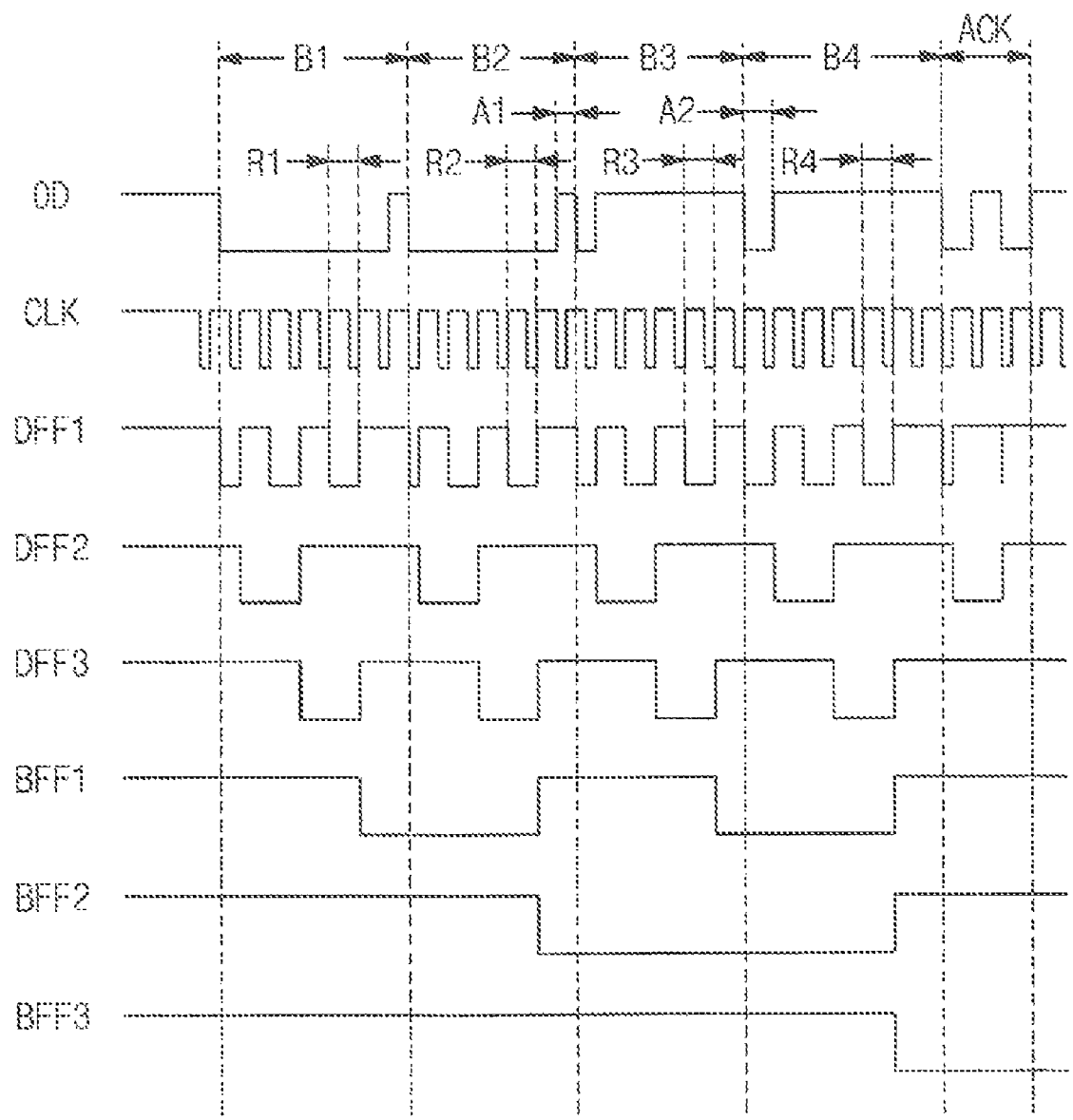
FIG. 6 is a waveform illustrating regions of a start signal and an ack signal of FIG. 5.

FIG. 6 is a waveform illustrating regions of a start signal and an ack signal of FIG. 5. FIG. 6 shows a case where the operation data OD are transmitted in four bits. In addition, in the above case, the falling edges of the operation data OD are used to perform triggering, but the falling edges or rising edges of other clocks can also be used to perform triggering.

Referring to FIG. 6, the data signal included in the operation data OD may be data comprising a number of bits. This data signal DS is divided into a first to a fourth periods B1 to B4 with respect to each bit. In addition, the sections A1, A2 maintaining a high level at the ends of the first and second periods B1, B2 are to make falling edges because an element receiving the data signal DS does a falling edge trigger operation. And, the first and second periods B1, B2 represent data with a low level, and the third and fourth periods B3, B4 represent data with a high level, i.e. "0011". At the subsequent ack period ACK there is applied the ack signal AS indicating the end of transmission of the data signal DS.

Three waveforms below the clocks CLK indicate flip-flops DFF1 to DFF3 of the data read part 51, the number of flip-flops is not limited to three. While three flip-flops are shown in FIG. 6 as an example to describe an embodiment of the present invention, the present invention is not limited thereto. And, the flip-flops of the bit recognition part are also shown in FIG. 6.

Referring to FIG. 6, the data signal DS of the operation data OD is applied longer than a constant period. This is to secure a margin between elements or between signals. Particularly, the flip-flops DFF1 to DFF3 configuring the data read part 51 are synchronized with the clocks CLK to determine at what point of time it recognizes the value of the data signal DS. That is, the read period R1 to R4 of the first and fourth periods B1 to B4 are points of time determined by the data read part 51. In other words, when the flip-flops DFF1 to DFF3 of the data read part 51 represent a specific logical value, the level of the received signal is recorded at the buffer latch 63 of the data output part 60. While FIG. 6 shows a case where the signal level of the data signal DS is recognized when the logical value represented by the flip-flops DFF1 to DFF3 is '010', the present invention is not limited thereto. That is, although the entire period required to apply one bit data signal DS is B1, the logical value of the data signal DS is recorded in the data output part 60 at the point of time when the flip-flops of the data read part 51 have the logical value of '010' in each bit section B1 to B4. In other words, the signal level of the operation data OD is '0' in the R1 section, and the signal level of the operation data OD is '1' in the R3 section. Accordingly, '0' and '1' are stored at the first bit region and the third bit region, respectively, of the buffer/main latches 63, 65 of the data output part 60.

And, a low level section A2 appearing at the early stage of the third and fourth bit sections B3, B4 is a margin for enabling the elements to recognize the falling edges. This will be described with reference to FIG. 7 and the subsequent figures.

The flip-flops BFF1 to BFF3 of the bit recognition part 53 designates bit regions so that data within each bit section B1 to B4 are recorded at each bit region. That is, the flip-flops BFF1 to BFF3 of the bit recognition part 53 within the first bit period R1 indicate the logical value as '111', and the flip-flops BFF1 to BFF3 of the bit recognition part 53 within the second bit period R2 indicate the logical value as '011'. Similarly, the logical values within the third bit period R3 and the fourth bit period R4 are indicated as '101' and '001', respectively. By doing so, the signal level values of each bit period R1 to R4 are stored at the latches 63, 65 corresponding to each logical value.

The data bit DB is stored at the latches 63, 65 of the data output part 60 in this manner, and the upper control device 10 transmits the ack signal AS to indicate the end of transmission of the data signal DS. It has been assumed that the ack signal AS has the logical value of '010' during the ack period ACK in FIG. 6. Accordingly, in the case that the falling edges are generated two times during the ack period ACK, the elements can recognize it. However, the present invention is not limited thereto. The operation data OD is transferred from the main latch 65 to the to-be-controlled chip 20 by the ack signal AS of the ack period ACK.

Figure 7A:
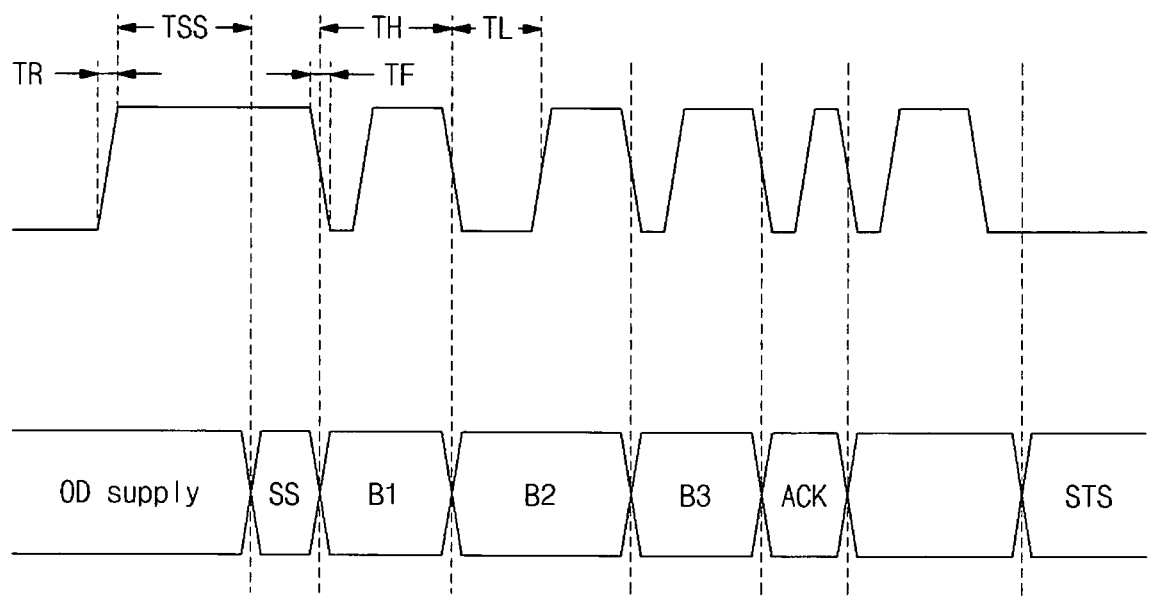
FIGS. 7a and 7b are examples of waveforms for illustrating Table 1.
Figure 7B:
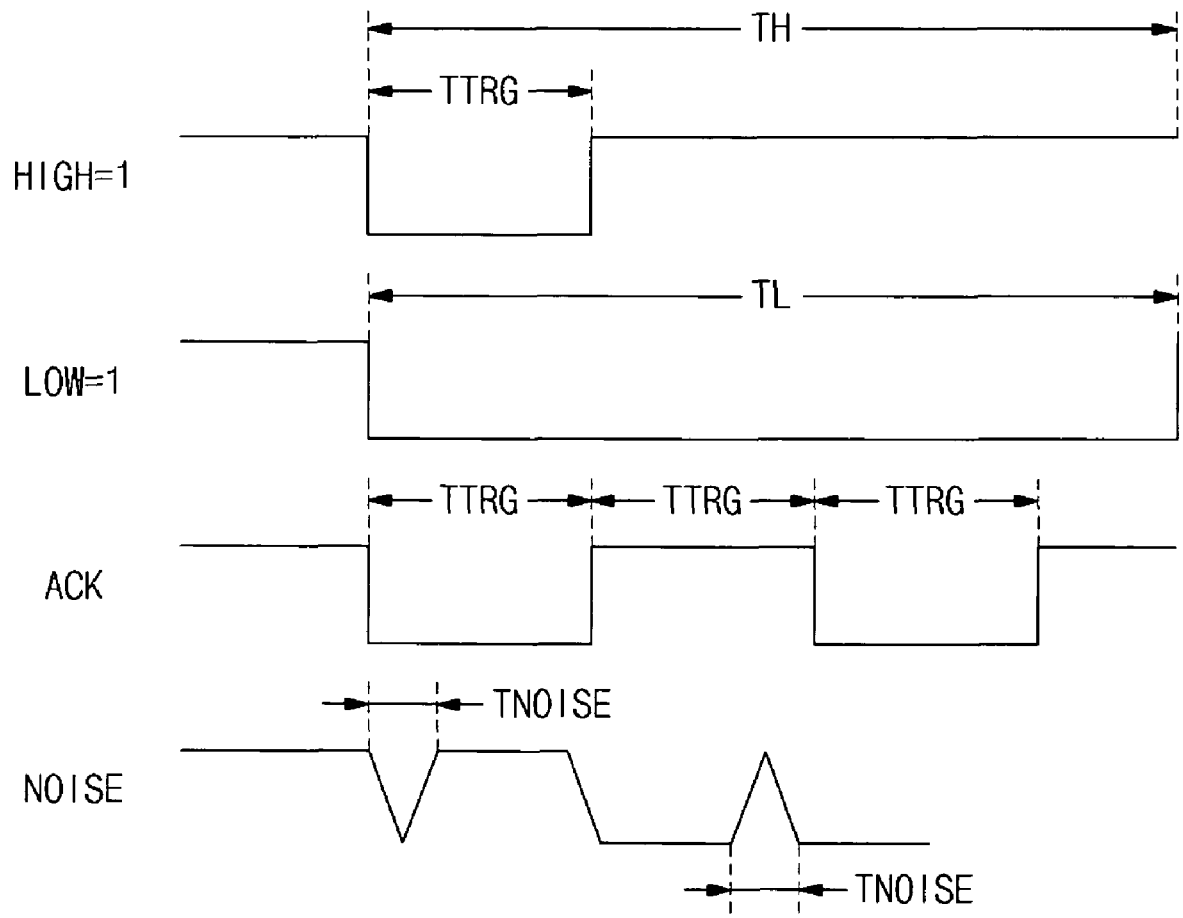

Table 1 shows the length of each signal of the operation data, and FIGS. 7a and 7b are exemplary waveforms for discussing Table 1.

TABLE 1

| Variable | Symbol | Minimum | Standard | Maximum | unit |
| --- | --- | --- | --- | --- | --- |
| Start time | $T_{SS}$ | 30 | | | µs |
| End time | $T_{STS}$ | 25 | | | µs |
| High level time | $T_H$ | 7 | | | µs |
| Low level time | $T_L$ | 6 | 8 | 10 | µs |
| Ack time | $T_{ACK}$ | 1.0 | 1.5 | 3.0 | µs |
| Rising time | $T_R$ | | | 100 | ns |
| Falling time | $T_F$ | | | 100 | ns |
| Pulse width | $T_{TRG}$ | 0.3 | 1 | 2.2 | µs |
| Noise length | $T_N$ | | | 0.1 | µs |

Table 1 and FIGS. 7a and 7b will now be described below.

In Table 1, the start time $T_{SS}$ means the minimum time required for the single wire serial communication module 30 to recognize the start signal SS, and the end time $T_{STS}$ means the minimum time required for the single wire serial communication module 30 to recognize the end signal STS. And, the high level time $T_H$ means the minimum time required for the single wire serial communication module 30 to recognize the data bit DB as high level, and the low level time $T_L$ means the minimum time required for the single wire serial communication module 30 to recognize the data bit DB as low level. The rising time $T_R$ means the maximum time required to change the signal of the operation data OD from low level to high level, and the falling time $T_F$ means the maximum time required to change the signal from high level to low level. The pulse width $T_{TRG}$ means the minimum time required for the single wire serial communication module 30 to recognize the falling edges. The noise length $T_N$ means the maximum length of noises that can be filtered through the filter. The above numerical values are provided only as an example in a case where the frequency of the clocks CLK from the oscillation circuit is 1 MHz in the falling edge trigger method, and thus the values can be varied when the rising edge trigger method is applied or when the frequency of the clocks CLK is changed, and depending on the properties of the elements.

In FIG. 7a, the operation data OD starts to be transferred from the upper control device 10 to the single wire serial communication module 30, the potential of the single bus 15 changes from low level to high level. At this time, time it takes to change from low level to high level is less than 100 ns as shown in Table 1. And, if a constant time lapses after the potential of the single bus 15 changes to high level, then the single wire serial communication module 30 recognizes it as the start signal SS. At this time, method how the single wire serial communication module 30 recognizes the start signal SS can be simply implemented by making the high level signal maintain a constant time. In particular, the present invention can actuate the single wire serial communication module 30 from the dormant state in which no power is consumed, making this method more important. As mentioned above, the single wire serial communication module 30 of the present invention is supplied with the clocks, and thus power needs to be supplied from the power supply to provide the clocks. At this time, driving power starts to be supplied at a constant time after the potential of the single bus 15 has been high because of the actuation time of the power supply. While the present invention makes time, when power starts to be supplied, be included in the start time TSS, the present invention is not limited thereto. In other words, Table 1 defines the start time $T_{SS}$ as 30 µs. At this time, a part of 30 µs can be supplemented for the delay time used for power supply. That is, if the start time is defined to include the time required for power supply depending on the properties of the elements, the acuation time of the single wire serial communication module 30 can be minimized. Referring again to FIG. 4 for description, a constant time after the potential of the single bus 15 has been high until the clocks CLK are generated, i.e. driving margin M1 is required. And, when fourteen clocks were counted after the margin M1, the single wire serial communication module 30 has recognized it as the driving start signal. That is, the delay time from the power supply has been minimally considered as more than 16 µs because one clock is 1 µs. Accordingly, the start-stop recognizer starts to recognize the signal received to the single bus 15 as the start signal SS after the potential of the single bus 15 has become more than 30 µs. This length of start signal SS is needed to prevent malfunctions due to noises, the data signal DS, and so forth.

If the single wire serial communication module 30 is converted from dormant state to driven state, the potential of the single bus 15 maintains the low level state during a constant time. At this time, it is preferable to set the falling time $T_F$ to maximally 100 ns to prevent the mal-recognition by the elements. And, the pulse width $T_{TRG}$ during which the potential of the single bus 15 maintains the low level constantly is the minimum time required to make the elements of the single wire serial communication module 30 recognize the falling edges by the clocks CLK. The above descriptions can also be applicable to the case that the elements do not recognize the falling edges but the rising edges. However, the high level state should be recognized during a constant time and there should exist a low level section for forming rising edges, in the case that the previous data bit has been in high level, so that the elements can recognize another rising edge prior to a rising edge, differently from the case that the elements recognize the falling edges. And, in the case that the frequency of the clocks CLK is higher, the length of the pulse width $T_{TRG}$ can be more shorten the present invention defines the length of the pulse width $T_{TRG}$ to be in the range of minimally 0.3 µs to maximally 2.2 µs, preferably, 1.0 µs, taking the frequency of the clocks into consideration. At this time, the minimum value, 0.3 µs, is determined by the frequency of the noises filtered through the filter. That is, the present invention configures the circuit so that the maximum length of the noises filterable through the filter is 0.1 µs. That is, the present invention defines the minimum length of time to prevent the filter from recognizing the signal whose pulse width $T_{TRG}$ is shorter than the minimum length of time as the noises.

If the single wire serial communication module 30 recognizes the falling edge, then the subsequent signal level starts to be recognized as the data bit DB. For this purpose, the potential of the single bus 15 should be maintained as much as the high level time $T_H$ and low level time $T_L$. It has been described with reference to FIG. 6 that the signal is recognized when the flip-flops DFF1 to DFF3 of the data read part 51 has a specific logical value. That is, the high level time $T_H$ and low level time $T_L$ each may be understood as a time margin for the operation of the flip-flops. Here, the high level time $T_H$ is set to be different from the lower level time $T_L$ because the high level time $T_H$ includes the pulse width $T_{TRG}$ required for the single wire serial communication module 30 to recognize the falling edge, but the present invention is not limited thereto.

In the case that the data bit DB is in the low level, time to maintain the high level is needed to form the falling edge prior to the transmission of the subsequent data bit DB. The time to maintain the high level is set to be the same as the high level time $T_H$ for the convenience of the control, but the present invention is not limited thereto.

If the data bit DB ends to be transferred, then the ack signal AS is transferred to indicate the end of the transmission of the data bit DB. It has been described in the present invention that the ack signal AS has the logical value of '010' to have two falling edges. Particularly, it is preferable to configure the time to maintain each logical value to include the pulse width $T_{TRG}$ which enables the single wire serial communication module 30 to recognize the signal since it is an object of the ack signal AS to indicate the end of transmission of the data signal DS. This has been shown in FIG. 7b.

The upper control device transmits the stop signal STS indicating the end of transmission of the operation data OD after the transmission of the ack signal AS. The stop signal STS can be implemented to enable the potential of the single bus 15 to maintain the low level during a constant time. At this time, it is preferable to maintain the low level longer than the low level time not to confuse it with the low level of the data bit DB. For this purpose, the end time is set to be minimally more than 25 µs in the present invention.

It should be understood that the above descriptions have been made on the basis of the falling edge trigger method, as mentioned above. The present invention is similarly applicable to the case of using the rising edge trigger method. However, the time to maintain the low level prior to the falling edge is needed to be replaced by the time to maintain the high level prior to the rising edge to apply the present invention to the case of using the rising edge trigger method because the potential of the single bus is varied after the falling edge and rising edge. That is, although the present invention is applied to the rising edge instead of the falling edge, only the point of time of recognizing the signal is varied and the operation and properties are applicable similarly.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

What is claimed is:

1. A single wire communication system comprising:
    an upper control device generating operation data comprising a start signal, a data signal, an ack signal, and a stop signal;
    a single wire communication module connected to the upper control device, the single wire communication module receiving the operation data and converting the data signal of the operation data to at least one bit of data bit; and
    a to-be-controlled chip operating by receiving the data bit from the single wire communication module;
    wherein the single wire communication module comprises:
        a filter removing noises added to the operation data;
        a module driver determining whether driven state or dormant state depending on the operation data;
        an oscillation circuit generating clocks according to the control of the module driver;
        a start-stop counter generating a signal confirm signal for determining the start signal or the stop signal;
        a start-stop recognizer providing an enable signal for maintaining the driven state to the module driver depending on the signal confirm signal;
        a data processor converting the data signal to generate the data bit; and
        a power supply supplying power for generating the clocks.

2. The single wire communication system of claim 1, wherein the single wire communication module is integrally formed with the to-be-controlled chip.

3. The single wire communication system of claim 1, wherein the filter provides the noise-removed operation data to the module driver and the data processor.

4. The single wire communication system of claim 1, wherein the module driver comprises a determination part comprising at least one of NAND gates or AND gates for determining the driven state or the dormant state.

5. The single wire communication system of claim 1, wherein the module driver maintains the oscillation circuit, the reset controller, the start-stop counter, the start-stop recognizer, the data processor, and the power supply at the driven state depending on the start signal.

6. The single wire communication system of claim 5, wherein the module driver maintains the driven state by the enable signal after the start signal has stopped being applied.

7. The single wire communication system of claim 1, wherein the start-stop counter comprises:
    a start counter recognizing the start signal; and
    a stop counter recognizing the stop signal.

8. The single wire communication system of claim 1, further comprises:
    a reset controller generating a reset signal by the operation data.

9. The single wire communication system of claim 8, wherein the start-stop counter comprises one counter recognizing the start signal and the stop signal, and
    the start-stop counter is reset by the reset controller after receiving the start signal, after receiving the stop signal, or upon receiving an abnormal signal.

10. The single wire communication system of claim 1, wherein the data processor comprises:
    a data output part storing and outputting the data bit of the data signal;
    a data read part enabling the data bit to be stored at the data output part depending on the operation data; and
    an ack lead part determining the ack signal.

11. The single wire communication system of claim 10, wherein the data output part comprises data storage regions as many as the number corresponding to the number of the data bits.

12. The single wire communication system of claim 11, wherein the data output part further comprises a bit recognition part selecting a storage region where logical values of the data bits are stored.

13. The single wire communication system of claim 12, wherein the bit recognition part controls the data output part to output the data bit depending on a combination of the ack confirm signal from the ack lead part and an inner signal of the bit recognition part.

14. The single wire communication system of claim 1, wherein the start signal comprises:
    a delay time required for the power supply to supply power to the oscillation circuit; and a high level maintain time comprising a total clock time counted by the clocks.

15. The single wire communication system of claim 1, wherein at least any one of the oscillation circuit, the module driver, the start-stop recognizer, the start-stop counter, and the data processor employs an edge trigger method recognizing at least one of a falling edge or rising edge of the operation data.

16. The single wire communication system of claim 15, wherein at least one of the data signal and the ack signal comprises a pulse width maintaining the low level logical value prior to the falling edge.

17. The single wire communication system of claim 15, wherein at least one of the data signal and the ack signal comprises a pulse width maintaining the high level logical value prior to the rising edge.

18. The single wire communication system of claim 16, wherein the pulse width is a time when at least one falling edge of the clocks occurs within the low level maintain period.

19. The single wire communication system of claim 1, wherein the time corresponding to the data bit of the data signal is shorter than at least one of the start signal and the stop signal.

20. The single wire communication system of claim 15, wherein the ack signal comprises at least two falling edges or rising edges, and the ack signal has a minimum time length required for the ack lead part to recognize the falling edge.

21. The single wire communication system of claim 18, wherein the pulse width or the minimum time length is longer than time period of noises filtered through the filter.

* * * * *